United States Patent [19]

Tognoni et al.

[11] Patent Number: 4,873,578
[45] Date of Patent: Oct. 10, 1989

[54] VIDEO CIRCUIT ENCLOSURE FOR ATTACHMENT TO A CATHODE RAY TUBE

[75] Inventors: Keith I. Tognoni, Winchester; John Fitzgerald, Leominster; Glenn Welch, Lynnfield; Paul Yonkers, North Chelmsford, all of Mass.

[73] Assignee: Digital Equipment Corporation, Maynard, Mass.

[21] Appl. No.: 78,778

[22] Filed: Jul. 28, 1987

[51] Int. Cl.⁴ ............................................. H04N 5/645
[52] U.S. Cl. .................................... 358/254; 358/248; 361/399
[58] Field of Search ................ 358/254, 248; 361/397, 361/399, 412, 413, 415; 174/194; 312/7.2; 313/318; 439/58, 80, 81, 683

[56] References Cited

U.S. PATENT DOCUMENTS 4,716,493 12/1987 Zelkowitz ............................ 358/254

OTHER PUBLICATIONS

*VR290 Color Video Monitor Illustrated Service Manual*, Digital Equipment Corporation, 1st Edition, Mar. 1986.

Primary Examiner—James J. Groody
Assistant Examiner—Kim-Yen Vu
Attorney, Agent, or Firm—Nutter, McClennen & Fish

[57] ABSTRACT

A video circuit enclosure for housing a video circuit, such as a video amplifier circuit that is used to drive a cathode ray tube is disclosed. The video circuit enclosure includes a video box with an open face through which the cathode ray tube is inserted. A video board, on which the video circuit is mounted is secured inside the video box. A heat sink is attached to one end of the video box and is a thermal path with heat-generating components on the video board. A socket board, located inside the video box, is mounted to the cathode ray tube. The socket board is located in the video box so it is slightly spaced away from the video board. A video cover is attached to the socket board and spaced away therefrom so it covers the open face of the video box. A set of spring loaded pin contacts attached to the socket board abut contact pads on the video board so as to provide a low impedance electrical slip connection between the boards. A video cover, attached to the socket board, is disposed over the open face of the video box.

18 Claims, 3 Drawing Sheets

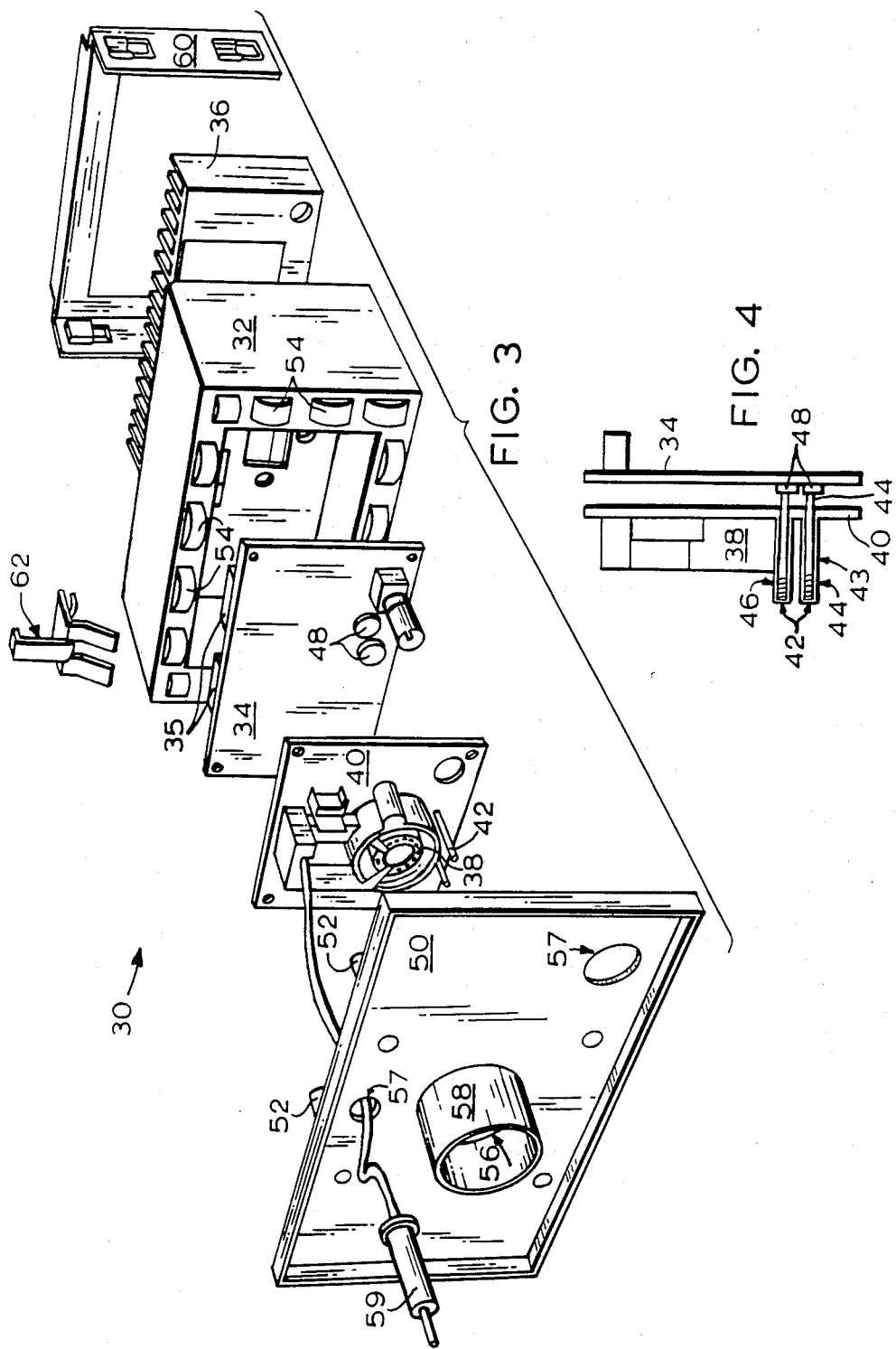

VIDEO CIRCUIT ENCLOSURE FOR ATTACHMENT TO A CATHODE RAY TUBE

FIELD OF THE INVENTION

This invention relates generally to the field of cathode ray tube video display terminals, and more particularly, to a video circuit enclosure for attaching a video circuit to the cathode ray tube.

BACKGROUND OF THE INVENTION

Video displays are almost always provided at data processing system work stations in order to provide a visual representation of the information being processed at any given instant. Most video displays have a cathode ray tube (CRT) to generate images of the information they are designed to display. Cathode ray tubes are large vacuum tubes that have a flat surface at one end that serves as a screen face, and taper into a cylindrical neck at the opposite end. A phosphorous coating is applied to the inside of the screen face, and an electron-emitting source, an electron gun, is housed in the neck of the tube and pointed toward the screen face. The electron gun is triggered to selectively emit electrons by a video drive circuit located external to the CRT. The electrons strike the phosphorous on the screen face, and excite it so light is momentarily emitted. The light emitted by the CRT is the visual image generated by the video display.

Recent advances in CRT technology and video drive circuit technology have made the development of ultra high resolution video display terminals possible. These terminals are able to generate images with exceedingly fine detail and shading that was previously difficult to display. Moreover, many video terminals currently being produced are able to generate color displays. The ultra high resolution CRTs are able to blend the three primary colors, which is typically what the electron gun, or set of guns inside the CRT, generate, into a very large spectrum of intermediate colors for display.

The new ultra high resolution video display terminals have become very useful because they can produce very complicated representations of the information being processed by the data processing system. Moreover, these video displays can be incorporated into a desk-top publishing system that, with the use of an appropriate printer, can be used to generate quantities of documents that include both textual and image material. An ultra high resolution display is an integral part of a desk-top publishing system because it can be used to display what material will be printed before the actual printing process is performed.

To date, however, there have been problems associated with connecting the cathode ray tube of ultra high resolution video display terminals to their associated video amplifier circuits. The video amplifier circuit of a video display terminal supplies the necessary signal voltages to the CRT to drive the electron gun or guns therein. In the past, video amplifier circuits have been on a circuit board, called the "video board", that is attached to the CRT. Conductive leads connected between the video board to a socket coupled to contact pins on the CRT would serve as the paths for signals transmitted to the CRT. In some instances, the socket was mounted directly to the video board, and in other instances, a hole was formed in the video board and the video board disposed around the end of the CRT.

Problems have arisen because ultra high resolution CRTs require CRT drive signals that are at very high frequencies in order to generate the desired detailed images. As the high frequency signals are forwarded to the CRT, the CRT inherently acts as a capacitor, and the conductive path to it inherently acts as an inductor. This results in the filtering and distortion of signals forwarded to the CRT, consequently the images generated by the CRT are subject to degradation.

Another problem associated with ultra high resolution video displays is that the video amplifier operates at a relatively high power level and transmits voltages to the CRT at very high frequencies. Consequently, the video amplifier in effect is a generator of spurious electromagnetic waves that could effect the operation of other nearby electronic devices. This is especially true if the video display terminal is adjacent other data processing devices that also operate at relatively high speeds and hence may be effected by even minute inductive currents generated by stray electromagnetic waves.

Another consideration in the design of an ultra high resolution video display terminal is the heat generated by their video amplifiers. Ultra high resolution video display video amplifiers generate large amounts of heat as a consequence of the large amounts of power they consume in order to provide the necessary video drive signals to the CRT. If the heat generated by the video amplifier circuit is not dissipated therefrom, the components that comprise the circuit may overheat resulting in their malfunction or possible burnout.

SUMMARY OF THE INVENTION

This invention provides a novel video circuit enclosure for connecting the video board of a video display terminal to the terminal cathode ray tube.

The video circuit enclosure of this invention includes a shielded video box which is secured to the chassis of the video display terminal it is part of. A video board, which carries the video amplifier circuit, is secured inside the video box. A heat sink is mounted to the video box and a thermal path is established between it and the heat generating components on the video board. A socket board, with a socket for receiving the cathode ray tube contact pins, is disposed inside the video box so that it is adjacent to the video board. Attached to the socket board is a shielded video cover that is disposed over the outside face of the video box. An opening is formed in the video cover so the neck of the cathode ray tube, with the contact pins, may be inserted therein for coupling to the socket board socket.

A set of spring loaded contact pins are used to provide a low impedance conductive path between the socket board and the video board. The pins are soldered into the socket board and the pins themselves abut surface contact pads on the video board. Compressible, conductive spring shields are disposed on the video box so that they are in contact with the video cover to provide a conductive path therebetween.

When a video display terminal with this video circuit enclosure is assembled, the cathode ray tube is mounted to a beveled frame so the socket board attached to it is disposed inside the video box adjacent to the video board, and the video cover is urged towards the open face of the video box. The socket board is disposed inside the video box whereby the conductive pins abut against the contact pads on the video board. The video cover is disposed against the video box whereby the spring shields provide a conductive path therebetween.

The video circuit enclosure of this invention provides shielding for the video amplifier circuit therein located on the video board and the socket board therein. This minimizes the possibility that electromagnetic radiation will be radiated due to the generation of video signals and their transmission to the cathode ray tube. Moreover, the distance the signals have to travel between the video amplifier circuit and the CRT is minimal. Since the path the signals have to travel is minimal, so is the inductance and consequential filtering of the high frequency signals that result in degradation of the desired image.

The heat sink attached to the video box provides an efficient means to dissipate the heat generated by the video amplifier circuit. This insures that the video amplifier components will not become overheated and subsequently malfunction or burn-out.

Another advantage of this video enclosure is that the cathode ray tube and the socket board are not rigidly connected to the video board or the video box. This insures that if the video display is jolted, or otherwise subject to abrupt mechanical shock, the cathode ray tube and socket board will be able to move independently of the video board. This eliminates the possibility of breaking the connection to the CRT when all the components attached to it don't move together. Furthermore, only a minimal amount of weight is attached to the CRT. This minimizes the possibility of it breaking if it is subject to a mechanical shock.

BRIEF DESCRIPTION OF THE DRAWINGS

FIG. 3 is an exploded view of the elements of the video circuit enclosure of this invention.

FIG. 4 is a detailed cross-sectional view of the spring loaded pins used to provide conductive paths between the socket board and video board of the video circuit enclosure of this invention.

DETAILED DESCRIPTION OF THE INVENTION

Figure 1:
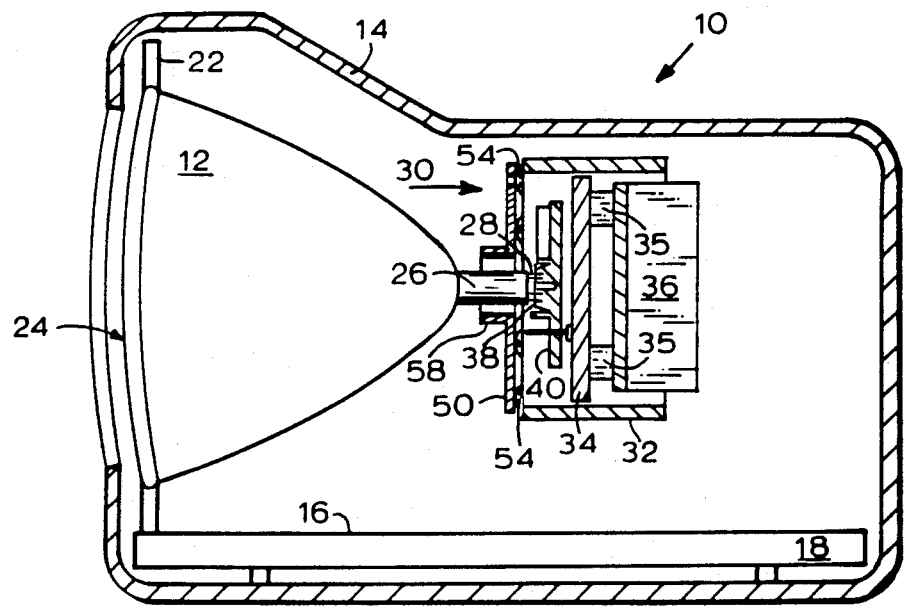
FIG. 1 is a cross section view of the video display terminal with a cathode ray tube coupled into a video circuit enclosure of this invention.
Figure 2:
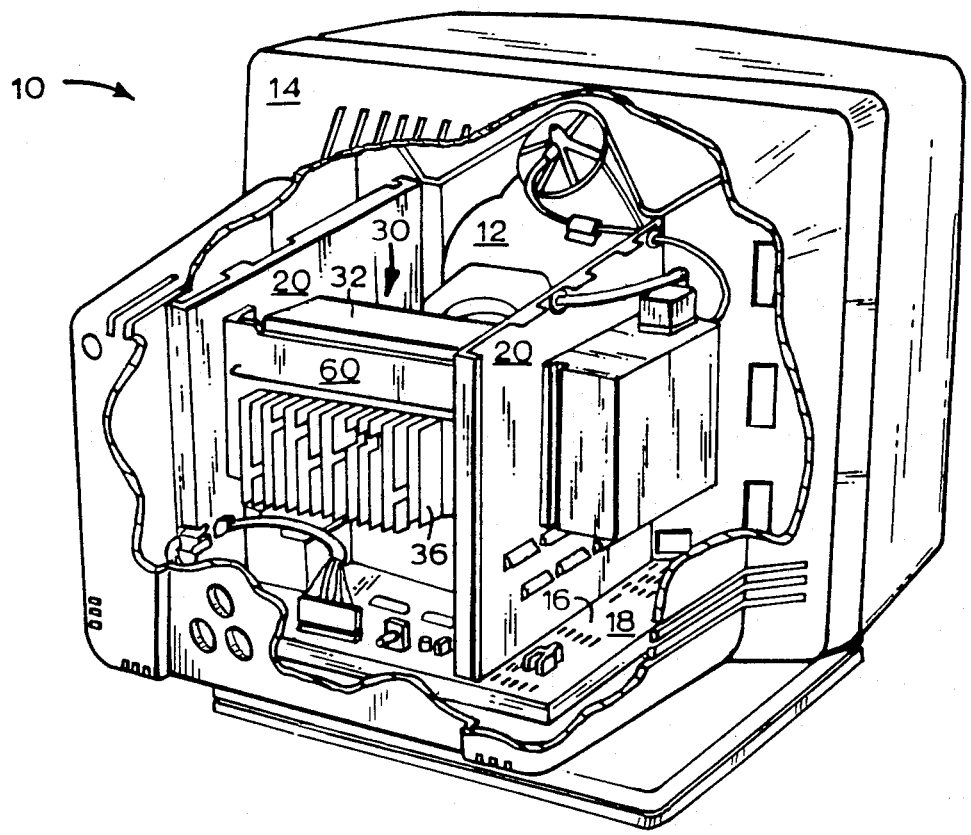
FIG. 2 is a cut-away view of a video display terminal with a cathode ray tube coupled into a video circuit of the invention.

FIGS. 1 and 2 illustrate a video display terminal 10 which uses a cathode ray tube (CRT) 12 to generate visual images of information being processed by the data processing system (not illustrated) the video display terminal 10 is attached to. The CRT 12, as well as all other components of the video display terminal 10, is contained within a protective housing 14 formed of a sturdy plastic. The CRT 12 is mounted on a chassis 16 which includes a horizontal base plate 18 that serves as a base for most of the video display 10 components, and two spaced-apart chassis walls 20. The CRT 12 is mounted to a beveled frame 22 that is integral with the chassis 16.

The CRT 12 has a relatively flat face 24 that serves as the screen face for the video display terminal 10. The body of the CRT is tapered from the face 24 and terminates into a cylindrical neck 26. Inside the neck 26 are one or more electron guns (not illustrated) for emitting electrons towards the face 24. A set of contact pins 28 disposed around a circle, and extending rearward from the CRT neck 26, provide electrical connections to the electron guns and deflection panels (not illustrated), also in the CRT 12 that serve to direct the electrons emitted from the guns.

The CRT neck 26 is mounted in a video circuit enclosure 30, best seen by reference to FIG. 3. The video circuit enclosure 30 includes a metal video box 32 that is open at the face where the CRT 12 is inserted into, and at the face opposite to it. Secured inside the video box 32 is a video board 34 on which the video amplifier circuit, which contains components 35 that supply power to and control the CRT 12, is mounted. A heat sink 36 is attached to the open end of the video box 32 adjacent to the rear of the video display terminal 10. The heat sink 36 is in a thermally conductive path with heat generating components 35 of the video amplifier circuit through intermediate heat spreaders, thermally conductive elements of the video box 32, or other means.

The CRT contact pins 28 are inserted into a socket 38 that is part of a socket board 40 located inside the video box 32. The socket board 40 is disposed inside the video box 32 so that it is separated away from the video board approximately 250 mils (0.250 inch). Electrical contact between the video board 34 and the socket board 40 for the high frequency CRT video drive signals is established by a number of spring loaded pins 42 that extend therebetween. The spring loaded pins 42, shown in detail in FIG. 4, each include a socket 43 that is solder secured to the socket board 40. A contact pin 44 extends outward from the socket 43 and is so biased by a spring-and-ball combination 46 therein (ball not illustrated). The contact pins 44 each abut separate, spaced-apart contact pads 48 on the surface of the video board 34 adjacent to the socket board 40. The contact pads 48 are electrically connected to the components 35 on the video amplifier circuit that supply the high frequency video drive signals to the CRT 12, and the contact pins 44 are electrically connected to the CRT contact pins 28 designed to receive those signals.

A video cover 50 is attached to the socket board 40 by a set of spacers 52 so that it is disposed over the open face of the video box 32 which the CRT 12 extends into. The video cover 50 is dimensioned so that it subtends the whole of the perimeter of the video box 32. Conductive spring shields 54 are disposed around the outer perimeter of the video box 32 that defines the opening wherein the CRT 12 is inserted. The video cover 50 is dimensioned so that it abuts the conductive spring shields 54. A hole 56 is formed in the video cover 50 so that the CRT 12 may be inserted in the video box 32 for coupling to the socket 38. A conductive, open ended cylinder 58, integral with the video cover 50 extends from around the video cover hole 56 and is dimensioned so that substantially all of the CRT neck 26 is shielded therein. Auxiliary openings 57 may also be formed in the video cover so other leads, such as a high voltage lead 59, may be extended therethrough.

A U-bracket 60 is attached to the rear of the video box 32 adjacent to the heat sink 36. The U-bracket is used to mount the video enclosure 30 to the chassis walls 20.

The video circuit enclosure 30 is assembled by first mounting the heat sink 36, the video board 34, and the socket board 40—video cover 50 sub assembly and the U-bracket 60 to the video box 32. Assembly clips 62, one shown, are used to temporarily hold the socket board 40—video cover 50 subassembly to the video box 32. The video circuit enclosure 30 is then inserted over the neck of the CRT, which had previously been mounted to the chassis 16. The video enclosure 30 is positioned so that the CRT contact pins 28 are inserted in the socket 38. The video circuit enclosure 30 is then secured to the video display terminal by fastening the U-bracket 60 to the chassis walls 20. The assembly clips 62 can then be removed from the video circuit enclosure because the force of the CRT contact pins 28 inside the socket 38 is thus sufficient to hold the socket board 40 and video cover 50 to the CRT 12. After the video enclosure 30 is secured to the video display terminal, the necessary electrical connections may then be made to it and the CRT 12.

The video enclosure 30 shields all of the electronics within it. The video box 32, the heat sink 36, and the outer cover 50 are all formed of metal that serves as a shield to prevent the components within from generating electromagnetic radiation that could affect other electronic devices. The spring shields 54 on the video box 32 function as a conductive path therebetween so the video cover 50 is at the same potential with respect to the other shielded elements of the video circuit enclosure and no electromagnetic radiation is emitted or enters through the space therebetween.

The heat sink 36 at the rear of the video enclosure 30 provides a means to dissipate the heat generated by components on the video board 34. This insures the components on the video board will not become overheated and possible malfunction or burn-out.

The arrangement of the socket board 40 adjacent to the video board 34 minimizes the distance the signals from the video amplifier have to travel to the CRT 12. This reduces the inductive path length the signals must travel, consequently minimizing the unintended filtering of the signals prior to their being received by the CRT 12. Thus, the degradation of the signals due to unintended filtering is similarly reduced.

Another advantage of this video enclosure is that it does not place an excessive amount of weight on the CRT 12. Only the socket board 40 and the video cover are directly mounted to the CRT 12. If the video display terminal 10 is subject to a mechanical shock, such as a jolt during shipping or being moved, the CRT 12 socket board 40 and video cover 50 will move independently of the other components of the video circuit enclosure 30. If the CRT 12, socket board 40 and video cover 50 do move relative to the other video circuit enclosure 30 components, the spring loaded pins 42 will move or "slip"; however, they will continue to abut the contact pads 48 on the video board 34 so as to maintain the electrical connection between the video board 34 and the socket board 40. The spring shields 54 dampen and block the movement of the video cover 50 so that the socket board 40 does not abut against the video board and the CRT 12 so as to subject both boards to the possibility of being broken thereby. Thus, the CRT 12 is not subject to receiving an excessive mechanical strain by the video circuit enclosure 30, and the circuitry that is mounted to it, that could possibly cause the CRT, the associated circuitry, attached to it, or the connection therebetween, to break.

Furthermore, the video enclosure of this invention is relatively simple to install and economical to manufacture.

This description is for the purpose of description only. Alternative embodiments of this invention are possible without departing from the scope of the claims.

For example, other means beside the spring loaded pins may be used to provide the electrical paths between the socket board and the video board and that are able to withstand movement of the socket board and video board relative to each other if the video display terminal is subject to shock. Moreover, in the foregoing description, the spring loaded pins are only used to establish an electrical connection for the high frequency CRT drive signals, electrical connection for the low frequency bias and power signals are established by conventional means not part of this invention. However, in certain embodiments of this invention, it may be desirable to establish the low frequency bias or power signals with connections similar to those used for the high frequency CRT drive signals. Alternative means to install the video circuit enclosure to the CRT may be used. For instance, the CRT can be first coupled to the video circuit enclosure and the sub-assembly mounted to the video circuit enclosure and the sub-assembly mounted to the video display terminal. Moreover, this video circuit enclosure can be used with other video display devices besides video display terminals that employ a CRT to generate images.

Therefore, it is the object of the appended claims to cover all such variations and modifications as come within the true scope and spirit of the invention.

What is claimed as new and desired to be secured by Letters Patent of the United States is:

1. A video circuit enclosure for attachment to a cathode ray tube, the cathode ray tube having a screen face and a neck extending away from the face, said neck having at least one conductive terminal for the cathode ray tube, the video circuit enclosure comprising:
   (a) video box formed of conductive material so as to form a shield, said box disposed over the portion of the cathode ray tube have the conductive terminals, said box forming an open face into which the cathode ray tube neck is inserted;
   (b) a video board secured inside said video box, said video board including at least a video circuit for supplying signals to the cathode ray tube;
   (c) a socket board disposed inside said video box closely spaced from said video board, said socket board having a socket means for coupling to the cathode ray tube so that it is attached thereto and in electrical contact with the cathode ray tube terminal;
   (e) an electrical connection means connected to said socket means able to maintain a conductive path for signal transfer therebetween when said video board and said socket board move relative to each other; and
   (d) a video cover formed of conductive material disposed over said video box open face and forming an hole the cathode ray tube is positioned in, said video cover attached to said socket board and spaced away therefrom so that when said socket board is disposed in said video box, said video cover is in electrical contact with said video box.

2. The video circuit enclosure of claim 1 wherein the video circuit includes one or more heat generating components, and a heat sink attached to said video box, said heat sink being in thermal contact with said video circuit heat generating components.

3. The video circuit enclosure of claim 1 wherein at least one of said electrical connection means comprises:

(a) a contact pin assembly secured to said socket board with a movable contact pin biased towards said video board; and (b) a contact pad on said video board adjacent to said socket board and located so that said contact pin abuts thereto.

4. The video circuit enclosure of claim 3 wherein the video circuit includes one or more heat generating components, a heat sink attached to said video box, and said heat sink is being in thermal contact with said video circuit heat generating components.

5. The video circuit enclosure of claim 1 further including a chassis, a mounting for mounting the cathode ray tube to said chassis, and said video box mounted to said chassis separate from said cathode ray tube-to-chassis mounting.

6. The video circuit enclosure of claim 1 wherein said socket board is spaced from said video board approximately 0.250 inches.

7. A video circuit enclosure for attachment to a cathode ray tube, the cathode ray tube having a screen face and a neck extending away from the face, said neck having at least one conductive terminal for the cathode ray tube, the video circuit enclosure comprising:

(a) a video box formed of conductive material so as to form a shield, said box disposed over the portion of the cathode ray tube having the conductive terminals, said box forming an open face into which the cathode ray tube neck is inserted;

(b) a video board secured inside said video box, said video board including at least a video circuit for supplying signals to the cathode ray tube;

(c) a socket board disposed inside said video box and spaced away from said video board, said socket board having means for receiving the cathode ray tube conductive terminals so as to secure the socket board thereto, and having a contact pin assembly with at least one movable contact pin electrically connected to one of said cathode ray tube conductive terminals, said contact pin being biased towards said video board; and (d) a conductive contact pad located on said video board adjacent said contact pin so that said contact pin abuts thereto so as to provide a conductive path between said video board and the cathode ray tube conductive terminals.

8. The video circuit enclosure of claim 7 wherein the video circuit includes one or more heat generating components, a heat sink attached to said video box, said heat sink being in thermal contact with said video circuit heat generating components.

9. The video circuit enclosure of claim 7 further including a video cover disposed over the open face of the video box in which the cathode ray tube is inserted, said video cover formed of conductive material and being attached to said socket board so that it is spaced away therefrom; and said video cover forming a hole the cathode ray tube is disposed.

10. The video circuit enclosure of claim 7 further including a chassis, a mounting for mounting the cathode ray tube to said chassis, and said video box being mounted to said chassis separate from said cathode ray tube-to-chassis mounting.

11. The video circuit enclosure of claim 9 wherein said socket board is spaced from said video board approximately 0.250 inches.

12. A video display terminal comprising:

(a) a housing;

(b) a cathode ray tube mounted in said housing, said cathode ray tube having a screen face and a neck extending away from said face, said neck having at least one conductive terminal for said cathode ray tube;

(c) a video box mounted to said housing separate from said cathode ray tube, said video box disposed over the portion of said cathode ray tube having said conductive terminals and forming an open face into which said cathode ray tube neck is inserted, said video box formed of conductive material so as to form a shield;

(d) a video board secured inside said video box, said video board including at least a video circuit for supplying signals to said cathode ray tube;

(e) a socket board disposed inside said video box closely spaced from said video board, said socket board having a socket means for coupling to the cathode ray tube so that it is attached thereto and in electrical contact with the cathode ray tube terminal;

(f) an electrical connection means connected to said socket means able to maintain a conductive path for signal transfer between said video board and the cathode ray tube terminals when said video board and said socket board move relative to each other, and (g) a video cover formed of conductive material disposed over said video box open face and forming an hole the cathode ray tube is positioned in, said video cover attached to said socket board and spaced away therefrom so that when said socket board is disposed in said video box, said video cover is in electrical contact with said video box.

13. The video display terminal of claim 12 wherein the video circuit includes one or more heat generating components, a heat sink attached to said video box, said heat sink being in thermal contact with said video circuit heat generating components.

14. The video display terminal of claim 12 wherein said electrical connection means comprises:

(a) a contact pin assembly secured to said socket board with a movable contact pin biased towards said video board; and (b) a contact pad on said video board adjacent to said socket board and located so that said contact pin abuts thereto.

15. The video circuit enclosure of claim 14 further including a chassis inside said housing, the cathode ray tube mounted to said chassis, said video box being mounted to said chassis separate from said cathode ray tube-to-chassis mounting.

16. The video circuit enclosure of claim 12 wherein the video circuit includes one or more heat generating components, a heat sink attached to said video box, and said heat sink being in thermal contact with said video circuit heat generating components.

17. The video circuit enclosure of claim 12 further including a chassis inside said housing, a mount for mounting the cathode ray tube to said chassis, and said video box mounted to said chassis separate from said cathode ray tube-to-chassis mounting.

18. The video display terminal of claim 12 wherein said socket board is spaced from said video board approximately 0.250 inches.

* * * * *